(No Model.) 2 Sheets—Sheet 1.
E. G. T. COLLES.
FEED WATER HEATER.
No. 351,360. Patented Oct. 26, 1886.
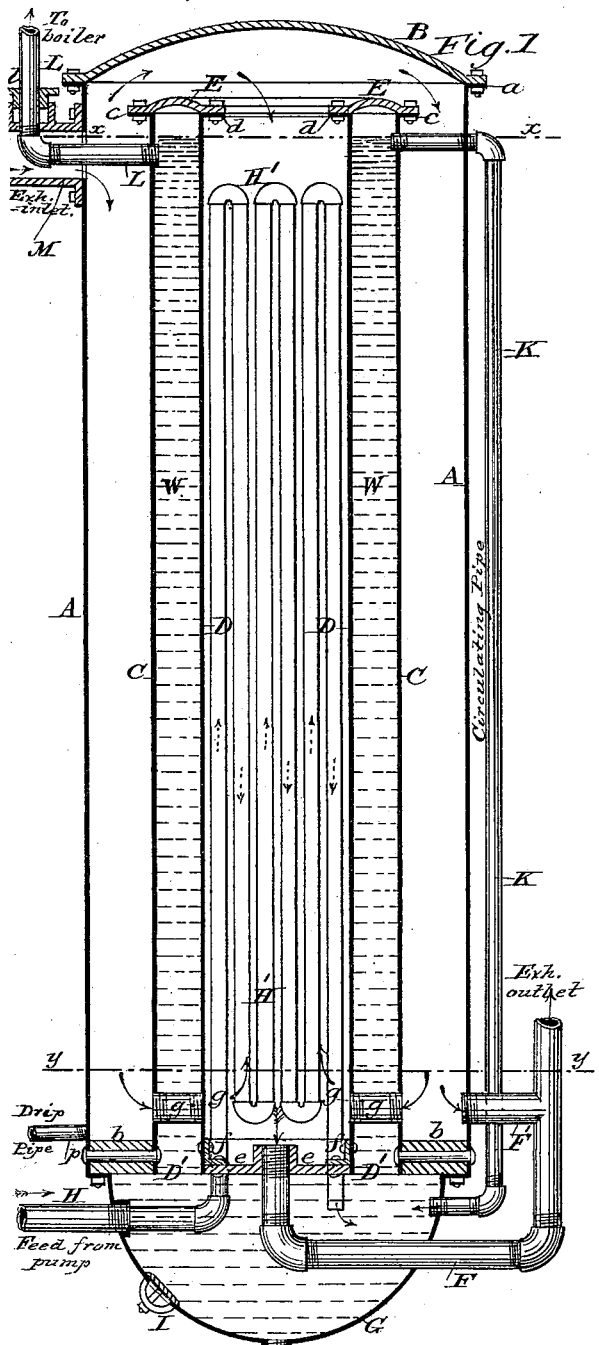
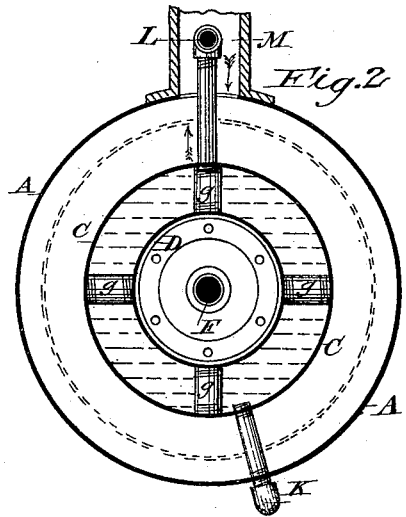
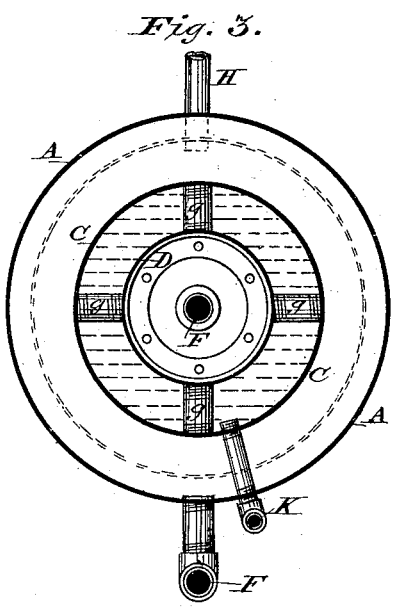
Witnesses:
H. L. Todd.
Louis Beyer.
Inventor:
E. G. T. Colles,
By T. C. Brecht,
Attorney.
N. PETERS, Photo-Lithographer, Washington, D. C.

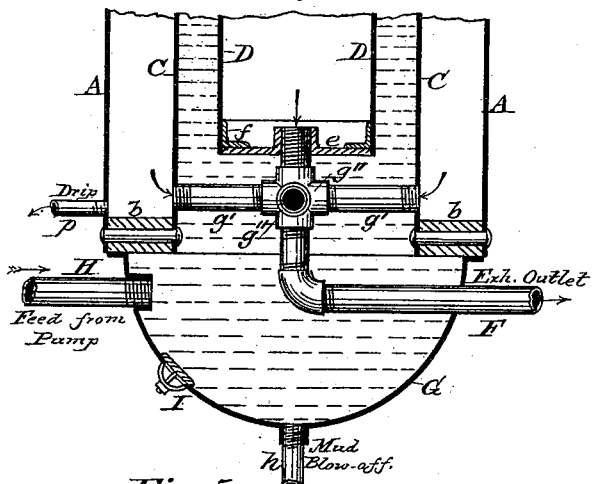
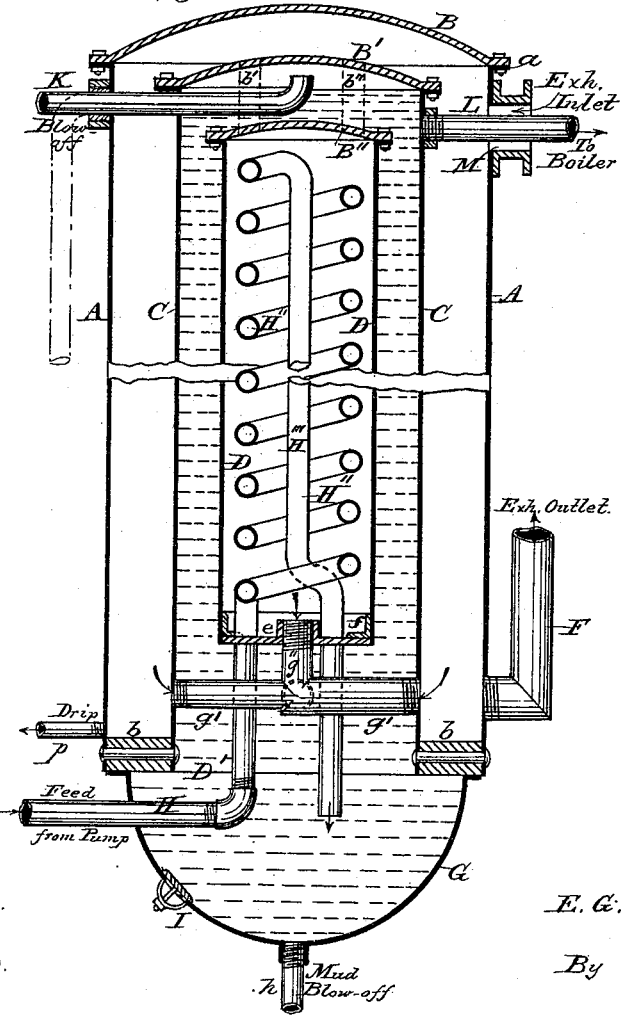

UNITED STATES PATENT OFFICE.

EDWARD G. T. COLLES, OF CHICAGO, ILLINOIS.

FEED-WATER HEATER.

SPECIFICATION forming part of Letters Patent No. 351,360, dated October 26, 1886.

Application filed June 16, 1886. Serial No. 205,337. (No model.)

*To all whom it may concern:*

Be it known that I, EDWARD G. T. COLLES, a citizen of the United States, residing at Chicago, in the county of Cook and State of Illinois, have invented certain new and useful Improvements in Feed-Water Heaters and Purifiers; and I do hereby declare the following to be a full, clear, and exact description of the invention, such as will enable others skilled in the art to which it appertains to make and use the same.

My invention relates to improvements in that class of feed-water heaters in which the water, during its passage through the heater to the boiler, is heated in an annular water-chamber surrounded by exhaust-steam, and forming an annular steam-jacket and central heating-chamber with a heating-coil.

The objects of the invention are to produce a very simple and efficient heater in which the feed-water can be heated to a very high degree of temperature before entering the boiler; to reduce the number of joints liable to leakage, usually caused by contraction and expansion of the parts; to reduce the bulk of water to a minimum in proportion to a maximum of heating-surface; to reduce the number of parts as usually required and necessary in ordinary feed-water heaters; to provide means by which the feed-water may be relieved of its impurities, as well as to remove the scum, which, as is well known, usually contains the lighter impurities, and which are carried to the surface of the water by the upward current, and thence to the boiler, where they form scale and sediment; furthermore, to provide easy means of access to the different parts without the necessity of breaking numerous joints; and, finally, to provide novel details of general construction and arrangement of parts, as more fully described hereinafter, and specifically pointed out in the claims, reference being had to accompanying drawings and the letters of reference marked thereon.

The same letters indicate the same parts in the different figures of the drawings, in which Figure 1 represents a vertical central section of a feed-water heater embodying my invention, partly in elevation. Fig. 2 is a horizontal cross-section on line *x x* of Fig. 1 with the coil removed. Fig. 3 is a similar view on line *y y* of Fig. 1 with the coil removed. Fig. 4 is a vertical central section of a modification of the lower part of the heater. Fig. 5 is a vertical central section of a modification of Fig. 1, partly broken.

In the drawings, A is the outer cylindrical shell of the heater, having its upper end closed by a removable cover, B, which is bolted to a flange, *a*, with a suitable packing between them. Within the shell A is arranged an annular water-chamber, W, consisting of the cylinders C and D, closed at their upper end by an annular cover or head, E, and communicating at their lower end by the annular opening D′ with a lower water-chamber or mud-drum, G, bolted to the band *b*. The cylinder D is closed at its lower end by a head, *e*, secured by an angle-iron ring, *f*, and is open at top, communicating with the steam-jacket formed by the shell A and cylinder C, while the cylinder D forms the inner steam-chamber, and connects with said steam-jacket by a series of thimbles or tubes, *g*, below. The cover E is secured to the flanges *c* and *d*, having packing between them, by suitable bolts. The outlet-pipe, F, for the steam is attached to the head *e* and passes through the mud-drum, and may be arranged to communicate with the steam-jacket by a branch pipe, F′, if desired. The mud-drum G is preferably made of concave form, and is provided with a blow-off pipe, *h*, by which the sediment can be blown out when desired, or removed through hand-holes I. The feed-water pipe H passes through the mud-drum, and is connected to one end of the coil H′, which nearly fills up the steam-chamber, extending to near its upper end, and finally descends into or through the lower water-chamber or mud-drum, G. A circulating-pipe, K, communicates with the upper surface in the water-chamber and the mud-drum, and serves also to convey the scum, light impurities, &c., carried to the surface of the water by the ebullitions, to the mud-drum G. A drip-pipe, *p*, arranged near the bottom of the steam-jacket, carries off the condense-water from the steam-jacket. A feed-pipe, L, for the heated feed-water, passes through a stuffing-box, *l*, on the inlet-pipe M for the steam, secured near the upper end of the heater, and said stuffing-box serves to compensate for the expansion and contraction. The water will be thus heated to the highest temperature possible before being delivered to the boiler by the exhaust-steam, and before being cooled or condensed. The annular water-chamber W connects with the water in the mud-drum by the annular opening D', formed by the lower end of the shells C and D, and any impurities not carried to the upper surface of the water will descend and pass through said opening D' into the mud-drum. If desired, hand-holes may be arranged in the shell A to gain access to the space in the steam-jacket.

In the modification shown in Fig. 4 the inner steam-chamber is connected by radial pipes $g'$, united by a central joint-piece or manifold, $g''$, to which the outlet-pipe F is also attached, and passes through the mud-drum G to any place desired.

In the modification shown in Fig. 5 the inner steam-chamber communicates by the radial pipes $g'$ and vertical pipe $g''$ with the steam-jacket, to which the outlet-pipe F for the steam is connected. The feed-water pipe H communicates with a worm or serpentine coil, H'', through which the feed-water passes, and finally descends through the pipe H''' into the water contained in the mud-drum. In this case the inner cylinders, C and D, are provided with separate bonnets B' and B'', connected by tubes $b'\ b''$, although an annular head, E, as shown in Fig. 1, may be employed.

The heaters can be made of any size and suitable material. All the parts can freely expand and contract without the danger of loosening any joints. All the parts are readily accessible, and they can be produced at a comparatively small expense.

All the steam, water, or other pipes must be provided with suitable valves, as required.

The operation is as follows: The steam is admitted through the inlet-pipe M, and passes into the steam-jacket, as well as to the central steam-chamber around the top of the annular water-chamber, and through the thimbles $g$, or equivalents, thus virtually surrounding the water in the water-chamber W and imparting its heat to the water. The valve in the outlet-pipe L must be closed until the water is sufficiently heated to be admitted to the boiler, to which it flows in the usual manner. The feed-water may be admitted direct to the mud-drum, although I prefer to pass it through the coil in the inner steam-chamber, and after ascending in the annular water-chamber it has become highly heated. It is relieved of its lighter impurities, having ascended to the surface by the ebullitions of the water by means of the circulating-pipe K, which deposits them in the cooler water of the mud-drum, while the heavier particles descend by gravity and are deposited there, from which they can be blown out or removed. If it is desirable to gain access to the steam-jacket, central steam-chamber, or annular water-chamber, it is only necessary to remove the covers or bonnets, and for ordinary purposes the mud-drum is accessible without removing it through the hand-holes, of which there may be one or more.

Having thus described my invention, what I claim, and desire to secure by Letters Patent, is—

1. The annular water-chamber connected to the mud-drum by an annular opening at its base and by a circulating-pipe with bottom and top, as and for the purpose set forth.

2. The combination of an annular water-chamber and a steam-jacket and central steam-chamber, connected at their tops and bottoms with a mud-drum, and a circulating-pipe, substantially as set forth.

3. The combination of a central steam-chamber containing a coil of pipe connected to the feed-water pipe and with the water in the mud-drum, and the annular water-chamber inclosed in the steam-jacket, as specified.

4. The combination of a central steam-chamber connected at its upper and lower ends with the steam-jacket and containing a coil of pipe communicating with the feed-water pipe and the water in the mud-drum, all arranged as and for the purpose set forth.

5. In a feed-water heater, the annular water-chamber connected to the mud-drum by annular opening D', the heating-coil, and feed-water pipe, arranged substantially as shown, in combination with the outlet-pipe L, passing through the steam-inlet pipe M, as and for the purpose herein specified.

6. The combination of an annular water-chamber surrounded substantially by steam, connected to the mud-drum by an annular opening, and inclosing a heating-coil arranged in the central steam-chamber communicating with the steam-jacket, all substantially as and for the purpose specified.

7. The combination of an annular water-chamber connected to the mud-drum, as shown, and forming the central steam-chamber communicating at top and bottom with the steam-jacket, and the inlet and outlet pipes, all arranged as set forth.

8. The combination, in a heater having an annular water-chamber surrounded substantially by steam, of the mud-drum connected to said chamber by annular opening D', and a circulating-pipe arranged to create a circulation of water and to remove the surface-scum, as herein specified.

9. In a feed-water heater, an annular water-chamber forming a central steam-chamber, communicating at top and bottom with a steam-jacket having steam-inlet at its top and steam-outlet through its closed bottom $e$, secured by angle-iron band $f$, all substantially as set forth.

10. In a feed-water heater, the combination of a steam-jacket communicating at top and bottom with a central steam-chamber, and an annular water-chamber connected to the mud-drum, as shown, the heating-coil, the circulating-pipe, and the inlet and outlet pipes, all as specified.

11. A feed-water heater in which the feed-water enters into a heating-coil, passes into a mud-drum, and ascends in an annular water-chamber, whence it passes in a purified and heated state to the boiler, being heated in its passage by a central steam-chamber and a steam-jacket communicating with each other, substantially as and for the purpose set forth.

In testimony whereof I hereby affix my signature in presence of two witnesses.

E. G. T. COLLES.

Witnesses:
LOUIS BEYER,
H. L. TODD.